(12) United States Patent
Sturgeon et al.

(10) Patent No.: US 7,190,480 B2
(45) Date of Patent: *Mar. 13, 2007

(54) METHOD AND APPARATUS FOR ORGANIZING SCANNED IMAGES

(75) Inventors: Derrill L. Sturgeon, Spring, TX (US); John C. Barker, Houston, TX (US); Donald Michael Brown, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

This patent is subject to a terminal disclaimer.

(21) Appl. No.: 10/208,399

(22) Filed: Jul. 30, 2002

(65) Prior Publication Data

US 2002/0186424 A1  Dec. 12, 2002

Related U.S. Application Data

(63) Continuation of application No. 09/385,334, filed on Aug. 30, 1999, now Pat. No. 6,466,336.

(51) Int. Cl.
*H04N 1/04* (2006.01)
*G06K 9/54* (2006.01)
*G03G 15/00* (2006.01)

(52) U.S. Cl. .................... 358/1.17; 358/474; 382/305; 399/43

(58) Field of Classification Search ............ 358/474, 358/1.16, 1.17, 1.18, 403, 404, 406, 448, 358/444, 1.9, 296, 300, 437, 450, 468; 714/746; 399/43, 81, 367; 382/305, 312, 317, 318, 382/319

See application file for complete search history.

(56) References Cited

U.S. PATENT DOCUMENTS

| | | | | |
|---|---|---|---|---|
| 4,295,206 A | * | 10/1981 | Cain et al. | 707/7 |
| 4,760,606 A | * | 7/1988 | Lesnick et al. | 382/306 |
| 4,970,554 A | * | 11/1990 | Rourke | 399/84 |
| 5,109,439 A | * | 4/1992 | Froessl | 382/305 |
| 5,124,798 A | * | 6/1992 | Tanabe et al. | 358/296 |
| 5,339,412 A | * | 8/1994 | Fueki | 707/104.1 |
| 5,367,362 A | * | 11/1994 | Forest | 399/43 |
| 5,384,785 A | * | 1/1995 | Yoda | 714/746 |
| 5,889,896 A | * | 3/1999 | Meshinsky et al. | 382/305 |
| 6,331,039 B1 | * | 12/2001 | Iwasaki et al. | 347/11 |
| 6,466,336 B1 | * | 10/2002 | Sturgeon et al. | 358/444 |
| 6,735,335 B1 | * | 5/2004 | Liu et al. | 382/218 |

* cited by examiner

*Primary Examiner*—Kimberly Williams
*Assistant Examiner*—Charlotte M. Baker

(57) ABSTRACT

A system is provided for scanning batch-type documents containing indicia on either a single side or on two sides of each document sheet. Misfeeds through a scanning device are identified by comparison of an anticipated number of pages with an actual number of scanned pages. Similar misfeeds may be identified by comparison of first and second series of pages in two-sided documents. Automatic collating of scanned pages is then performed where desired. The automatic collating may be based upon simple interleaving of pages, or upon recognition of page identifiers, such as page numbers in common or anticipated regions of the page. The scanning, analysis and collating operations may be followed by other processing steps, including transmission of facsimiles, printing, copying, and so forth.

11 Claims, 4 Drawing Sheets

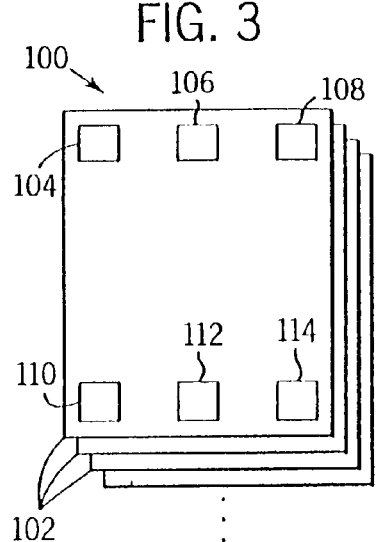
FIG. 3
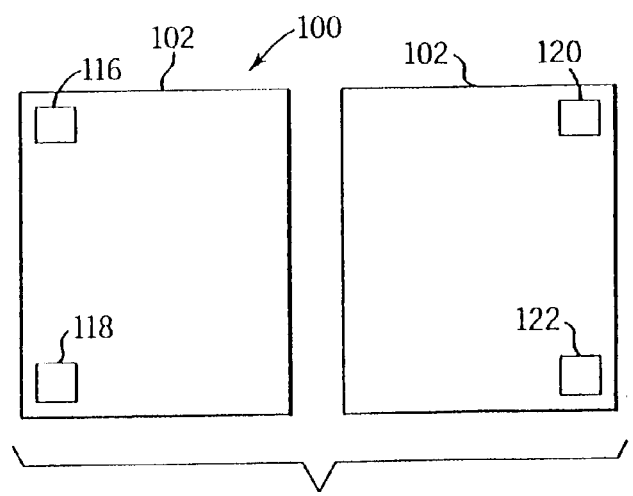
FIG. 4
FIG. 5
| DOCUMENT ORDER | SCAN ORDER |
|---|---|
| 1 | 1 |
| 2 | 3 |
| 3 | 5 |
| 4 | 2 |
| 5 | 4 |
| 6 | 6 |

METHOD AND APPARATUS FOR ORGANIZING SCANNED IMAGES

This application is a continuation of application Ser. No. 09/385,334 filed Aug. 30, 1999, issued as U.S. Pat. No. 6,466,336 on Oct. 15, 2002.

BACKGROUND OF THE INVENTION

1. Field of the Invention

The present invention relates generally to the field of document scanning wherein document pages are encoded digitally for storage and reproduction. More particularly, the invention relates to a novel technique for analyzing and organizing scanned pages to detect erroneously fed or scanned pages and to place the scanned pages in a desired order with a minimal degree of operator intervention.

2. Description of the Related Art

Digital document scanners have become a wide-spread tool in many document handling and production tasks. At present, digital scanners for encoding text and images are utilized in office environments both for the storage of documents, the transmission of documents, such as in facsimile machines, and the copying of documents, such as in digital copiers, and so forth. Scanners may include both hand-held devices, sheet-feed devices, and fill page devices. Moreover, full page devices may include automatic sheet-feeding arrangements for drawing a stack of documents to be scanned over a scanning surface in batch processes.

Digital scanners of the various types mentioned above generally include light sources and light detectors arranged to reflect radiation from a surface to be scanned, and to receive reflected radiation. The reflected radiation is then encoded to provide data representative of discrete picture elements or pixels on the document surface. The light source and receiver elements may provide for either single-color scanning or multiple-color scanning. Moreover, various resolutions are available, each dividing the scanned image into different numbers of pixels and different spatial densities of pixels in an image matrix. Once the image has been scanned, software routines are employed for analyzing and reconstructing an image, such as on a computer monitor, printer or copier, and for transmitting the image data, such as in a facsimile transmission or data file.

Where multiple page documents are scanned in batch processes, an operator may control the accurate duplication and collation of the scanned pages by manually placing the pages on the scanner one-by-one, or by manually monitoring the scanning process. However, where automatic sheet-feeders are employed, an operator is often freed to pursue other tasks while the scanner sequentially draws in the pages from a stack and scans them in the stack order. Certain scanners, such as in copying machines, are also available with automatic collating features for two-sided copying wherein pages having useful information on both sides are flipped in sequential scanning operations and either single or double-sided reproductions are produced.

Several problems arise in automatic sheet-feeding scanners. For example, in single-side scanners, when two-sided documents are to be scanned, an operator must process the batch job on a first or recto side, then reinsert the stack for scanning on the second or verso side, and subsequently manually collate the pages to interleave the odd and even pages. Where the scanner is employed for facsimile transmissions and similar operations, the receiver must perform this collating operation. In the event of "misfeeds," in which the scanner draws in more than one page at a time, the operator may receive a series of scanned pages which will not properly interleave due to the absence of one or more pages. The latter problem occurs not only in reproduction of double-sided documents in a scanner, but can result in the failure to fully scan even single-side documents. In either event, the operator is faced with the time consuming task of sorting through the scanned pages to identify the missing pages, re-scanning the missing pages, and inserting the missing pages in the appropriate location in the document.

There is a need, therefore, for an improved technique for scanning and managing documents which permits misfed pages, or absent pages, to be identified easily with a minimal amount of operator intervention. There is also a need for a technique which can interleave or reorganize scanned pages, such as two-sided pages scanned in a single-side batch job, while flagging mis-matching or missing pages in a sequence, also with a minimal degree of operator intervention.

SUMMARY OF THE INVENTION

The present invention provides a method and apparatus for scanning multiple page documents designed to respond to these needs. The technique may be employed on any type of scanner, including sheet-feed scanners or full page scanners, multi-function printers, copying machines, facsimile machines, and so forth. The technique permits a user to encode a series of pages, either single-sided or double-sided. Following the scanning process, data representative of the pages is analyzed to verify the order of the scanned pages, or to flag missing pages in a batch job. In the case of two-sided documents, the technique facilitates identification of misfeeds of either the recto or verso sides of the documents. The operator may then be notified of a misfeed, and re-scan any missing pages. A similar technique is employed for single-sided documents. The technique permits automatic interleaving of scanned pages of two-sided documents, as well as insertion and re-ordering of pages in both two-sided and single-sided documents. Moreover, the technique may employ character recognition devices, such as optical character recognition, to identify page designations where these are present on one or more of the pages. The locations of the page designations may be automatically determined or may be input by an operator. Misfeeds and interleaving may proceed based upon the recognized page designations. Where such character recognition techniques are employed, they may be used to verify that sections of batch jobs are presented in a uniform page orientation. The recognition may then prompt reorientation of certain pages in the batch job to provide consistency in the scanned data and page presentation.

In addition to the basic interleaving and misfeed recognition functions, the technique may be adapted to provide some degree of tolerance in handling of the scanned pages. For example, tolerances may be provided for pages which are considered to be first or last pages in a sequence, particularly where optical character recognition routines are employed to identify the proper page order. Similarly, anomalies in page numbering may be permitted, particularly for pages in a sequence where the number of pages between recognized sequenced pages is proper but no page designation is found or recognized.

BRIEF DESCRIPTION OF THE DRAWINGS

The foregoing and other advantages of the invention will become apparent upon reading the following detailed description and upon reference to the drawings in which:

FIG. 3 is an exemplary representation of a series of pages in a batch-processed document, indicating locations in which page numbers may be provided for recognition by a computer system;

FIG. 4 is a representation of an alternative document presentation scheme in which page numbers are positioned in different locations on facing pages;

FIG. 5 is a diagram indicating typical interleaving of pages in a batch-processed document, particularly of a two-sided document, processed through a single-side scanner; and, FIG. 6 is a flow chart illustrating exemplary control logic for identifying misfeeds in a scanning system and for interleaving or reordering scanned pages.

DETAILED DESCRIPTION OF SPECIFIC EMBODIMENTS

Figure 1:
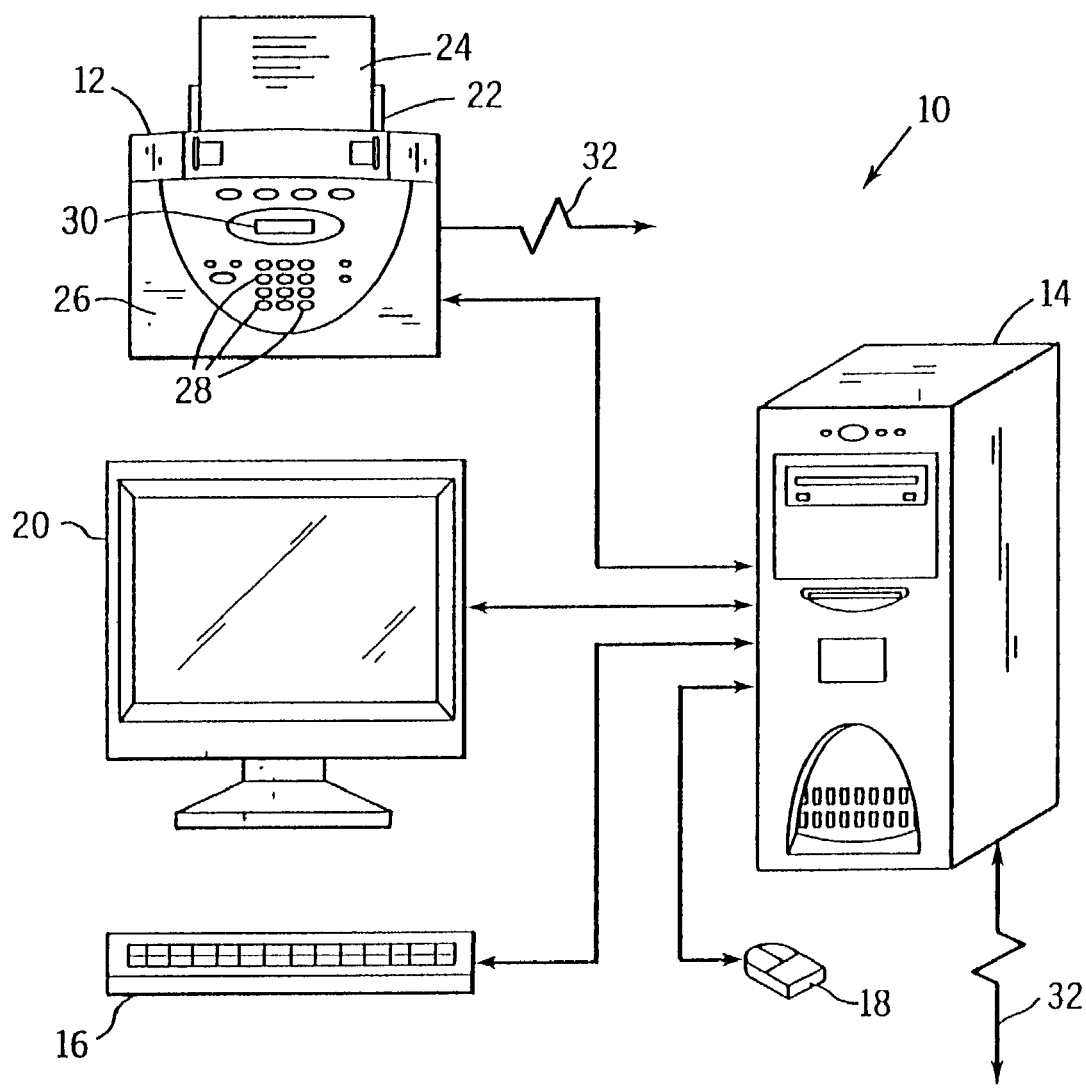
FIG. 1 is a diagrammatical representation of a computer system, including a scanning device for scanning pages and transmitting corresponding digitized data for subsequent processing.

Turning now to the drawings, and referring first to FIG. 1, a document handling system 10 is illustrated as including a scanning device 12, a computer 14, a keyboard 16, a mouse 18, and a monitor 20. System 10 is particularly well suited to inputting user-defined data, such as through the keyboard, mouse and monitor, as well as for inputting data by digitizing indicia on a page in the scanning device. In the illustrated embodiment, system 10 includes a stand-alone computer designed to carry out instructions based upon stored application software or indicia disposed on a document as described more fully below. It should be noted, however, that the system may include a series of networked computers, servers, peripheral devices, and so forth. Also, in the illustrated embodiment described herein, scanning device 12 is linked to computer 14, and serves multiple functions, including scanning or digitizing documents, printing documents, and transmission of facsimiles of documents. Accordingly, the scanning device may rely on certain of the circuitry and programming embodied within the computer, or may rely solely upon its own stand-alone circuitry and programming. In the latter case, certain of the techniques described herein may be employed on a self-sufficient device, such as a non-networked facsimile machine, multi-function peripheral device, photocopying machine, and the like.

As illustrated in FIG. 1, scanning device 12 is a sheet-feed scanner including a document feed tray 22 in which document 24 can be positioned for scanning. The present techniques may also be employed with hand-held scanners, flatbed scanners, and so forth. Device 12 further includes an interface panel 26 on which a series of input buttons or keys 28 are accessible by a user. Depending upon the particular configuration of the device, such keys may include conventional digit input keys, as well as particular function keys for executing such operations as scanning, copying, facsimile transmission, and instruction input. A read-out display 30 is provided on interface panel 26 to allow certain textual messages to be displayed for the user. Scanning device 12 may receive and transmit data via a telephone or similar network link 32. In the illustrated embodiment, computer 14 also includes a similar network link 32. Depending upon the system design, a single network link may suffice for the transmission and receipt of data to and from both the scanning device and the computer system.

Figure 2:
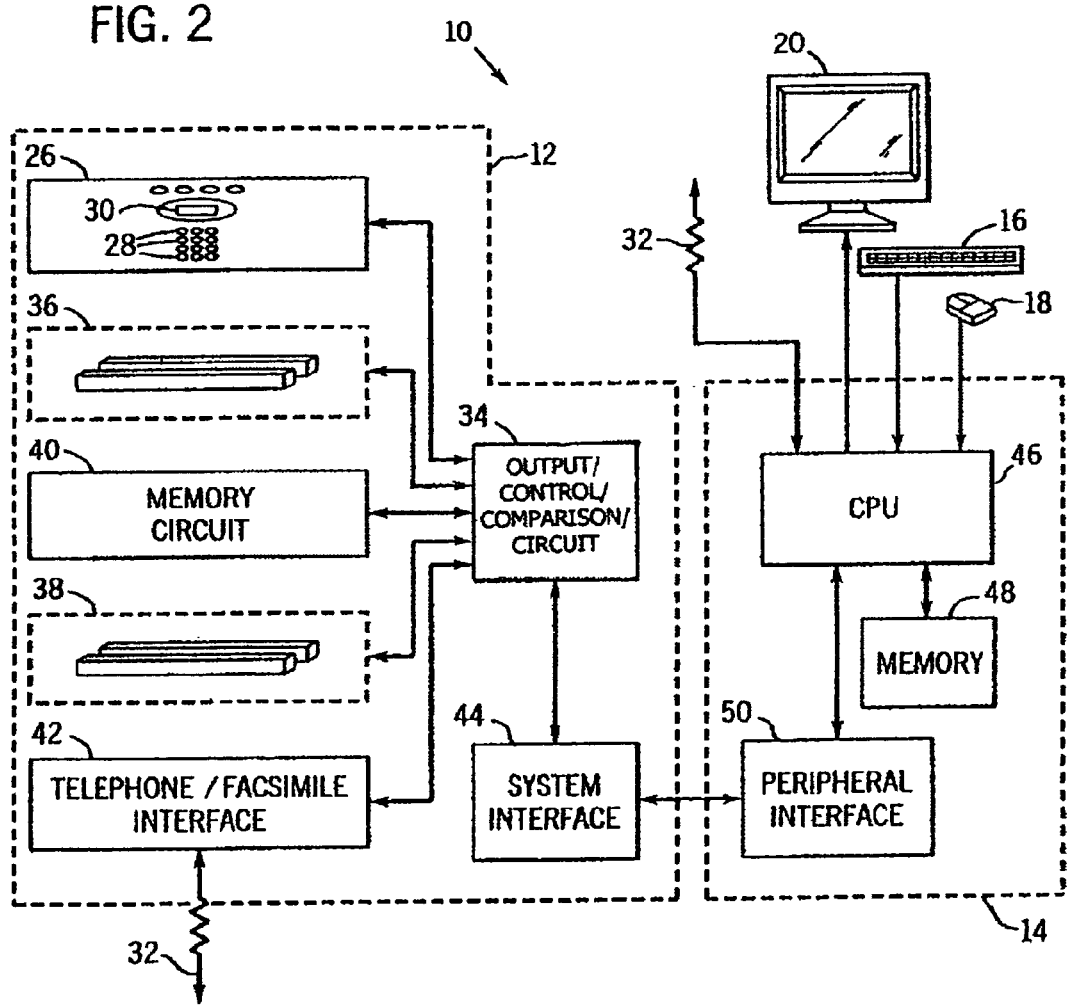
FIG. 2 is a diagrammatical representation of the system of FIG. 1 in somewhat greater detail, illustrating certain of the functional components or circuits within the scanning device and the computer system.

FIG. 2 illustrates certain of the functional circuitry and components of system 10 in a diagrammatical representation. As summarized above, the system generally includes a computer 14 linked to the scanning device 12. The user input and output devices, such as keyboard 16, mouse 18, and monitor 20, are linked directly to computer 14. While the scanning device 12 may include a wide array of functional circuits and hardware, depending upon its particular design, in the illustrated embodiment the device includes a control circuit 34 which is configured to execute programming code for independently controlling the operation of the various sub-circuits and components of the device. Thus, control circuit 34 is coupled to the input keys and display of interface panel 26 for receiving user-generated commands, and for displaying messages to a user. A scanning head 36 is provided within the device for digitizing indicia on documents fed into the device. As will be appreciated by those skilled in the art, scanning head 36 may be designed for either black-and-white scanning or for color scanning, or both. In general, such devices emit radiation to the surface of a document and detect reflections from the surface, encoding contrasting wavelengths differently to generate digital output data. The data is transmitted from scanning head 36 to control circuit 34 where it is processed as described below. A print head 38 is coupled to control circuit 34 to permit digitized data to be output on a printed page.

Control circuit 34 is also coupled to a memory circuit 40. This circuitry will typically include stored data, including programming code executed by control circuit 34 for carrying out the functions described below. Moreover, memory circuit 40 includes operational parameters employed by the device in scanning documents, printing documents, transmitting digitized data, and so forth. Any suitable memory devices may be included in circuit 40, such as volatile and non-volatile memory, disk drives, RAM, ROM, DRAM, and so forth.

Device 12 further includes interface circuits linked to control circuit 34 for exchanging data with other remote components. Thus, a telephone/facsimile interface circuit 42 is provided for sending and receiving data defining documents in facsimile format. A system interface circuit 44 is also provided for receiving and exchanging data and commands from computer 14.

It should be noted that certain of the functionalities described herein are designed to be carried out on peripheral devices such as a scanning device, including both scanning and printing capabilities. However, certain of the present techniques may be employed on devices having more limited capabilities, including scanning capabilities alone. Similarly, for certain of the techniques described herein, a telephone/facsimile interface circuit may not be required, particularly where scanned data is transmitted to a memory circuit or computer system for archival storage, further processing, transmission through the associated components, and so forth.

In the embodiment illustrated in FIG. 2, computer 14 includes a CPU 46 linked to a memory circuitry 48, as well as to a peripheral interface circuit 50. Computer 14 may be of any suitable type, such as a personal computer system, computer work station, laptop computer, and so forth. As will be appreciated by those skilled in the art, in general, CPU 46 executes pre-established programming code, typically in the form of application software. The code is stored in memory circuit 48 which may include hard disk drives, RAM, ROM, DRAM, and so forth. Peripheral interface circuitry 50 may include hardware, firmware, and software for driving scanning device 12 and for executing specific functions such as transmitting and receiving data representative of both operational instructions or parameters, as well as digitized documents.

In accordance with the present techniques, scanning device 12 can receive instructions for its operation in one of several manners. Firstly, manually input commands can be formulated by depressing keys 28 on interface panel 26. As the keys are depressed, signals are transmitted to control circuit 34 for executing specific functions, typically by reference to code stored within memory circuit 40. Secondly, specific instruction sets can be transmitted to the device from computer 14. Finally, instructions can be input via an instruction support sheet on which machine and human readable indicia are provided. The instruction support sheet may take various forms, depending upon the nature of the instructions to be provided, the document to be scanned, the operation to be performed during and following scanning, and so forth.

Document handling system 10 is particularly well suited to scanning and analyzing documents including multiple pages provided in groups or batch jobs. Such batch jobs may include single-sided pages, double-sided pages, or both. In the case of single-sided pages, the batch job may be held within scanning device 12 and each sheet fed through scanning head 36 to encode or digitize indicia displayed on the pages. The digitized data may then be processed by control circuit 34 or by computer 14, such as for cropping, sharpening, filtering, dynamic range adjustment, and so forth. The resulting scanned data is then stored either locally within the scanning device in memory circuit 40, or in memory external to the device, such as in memory 48 of computer 14. Double-sided documents are similarly processed. However, in the case of double-sided pages, the user may first scan a job stack on a recto side, then re-insert the job to scan the verso side of the double-sided pages. Again, the scanned data representative of the verso side of the sheets is processed and stored.

In conventional batch job scanning systems, several problems arise within the scanning sequence as summarized above. For example, the page drive employed to feed the individual sheets through scanning head 36 may malfunction, resulting in a misfeed, in which two or more pages are fed through the scanning device at once. Moreover, where a two-sided document is scanned, the user must generally reorganize the scanned pages following the scanning operation to provide the desired order in the stored document. The present technique provides for alerting the operator of certain types of misfeeds, as well as for collating pages of double-sided documents automatically. When the misfeed and collating functions are desired, the scanning device may be provided with specific instruction sets selectable by the user. Again, these instruction sets may be selected either by manipulation of keys on interface panel 26, or on an input device of computer 14, or through an instruction sheet which is scanned as a first sheet to the batch job.

As described more fully below, the process of misfeed identification is generally carried out by comparing the number of pages actually scanned to a desired or predetermined number. In doubled-sided scanning jobs, a number of pages in a first series (e.g. first pass or recto side) with the number of pages in a second series (e.g. second pass or verso side). Moreover, both types of comparisons may be performed to identify possible misfeeds in the overall job, as well as in either series. The desired number of pages is supplied either by the user through manipulation of keys of interface panel 26, or through identification of a number of pages on a scanned instruction sheet, such as through darkening of instruction locations corresponding to the known number of pages in a scanned job and encoding the corresponding number. Because the pages of the scanned job are stored or marked individually in memory circuit 40, a count of these pages is performed during the scanning operation. Where the number anticipated in the job does not correspond to the number of pages actually scanned and stored, an alert notification is provided to the user. Similarly, for double-sided jobs, where the number of pages of a recto series differs from that of a verso series, a similar notification is provided, indicating the probable location of the error in the first or second series. In certain scanning devices, an input tray may be provided with functionality whereby a number of sheets in a batch job is identifiable by page count, weight, or another technique. In such cases, the count compared in the misfeed identification sequence may be based upon a signal generated by the scanning device itself or an input tray sensor.

The collating operation of the present technique, also described more fully below, may be performed in one of several manners. For example, in a collating operation on a two-sided document, the scanning device may be instructed to simply interleave pages of a recto scanning series and those of a verso scanning series. The user then need only invert the batch job after the recto scanning series to encode the verso sides of each page, the pages then being collated by redesignation or reordering of the page data in the memory circuit. In another presently preferred configuration, the scanning device or the computer to which it is coupled is provided with character recognition capabilities enabling it to analyze at least one region of a document page, and preferably several regions, for identification of page designations. Where such page designations are located and identified, automatic collation may then be performed by reference to the designations and corresponding reordering of the pages in the memory circuit. For double-sided jobs, character recognition or similar techniques may also be used to determine inconsistencies in the orientation of certain pages of the batch job. For example, several orientations may be presented, such as due to insertion of a portion (commonly a verso side stack) into the scanning device and an orientation different from a first portion of the batch job. Regions containing page designations may then be designated as "normal" orientations for the particular portion of the batch job, with a software rotation being performed on one portion of the batch job (typically recto or verso) based upon the location of the page designation. Because commercially available character recognition routines may fail to accurately perform where page orientation is other than expected, in accordance with the present technique, the routine may be performed on regions of the scanned document in several possible orientations, rotated with respect to one another to provide for recognition of the page designation in any of several possible page orientations.

FIGS. 3 and 4 illustrate typical pages in a batch job of the type which may be scanned through system 10 and the probable locations of page numbers or similar designations on the sheets of the scanned job. The job, designated generally by reference numeral 100, includes a plurality of document sheets 102, with indicia to be digitized provided on one or both sides of each sheet. Page number locations may be anticipated in one of several positions on each document page. In the illustrated embodiment, such locations include an upper left corner 104, and upper middle position 106, an upper right corner 108, a lower left corner 110, a lower middle position 112, and a lower right corner 114. As shown in FIG. 4, such locations may also be identified on facing recto and verso pages of two-sided documents, with only several of these possible locations being shown in FIG. 4, notably upper left or lower left positions 116 or 118 of a left or verso sheet, or upper right or lower right positions 120 or 122 of a right or recto sheet. It should be noted that although reference is made herein to "sheets" and "pages", actual documents scanned may be supported on any suitable medium, including paper sheets, transparent sheets, as well as documents support between and located within transparent sheet covers, and so forth.

As noted above, the document scanning and management techniques described herein are particularly well suited to batch jobs in which a document scanning order is not necessarily the same as a desired document page order. FIG. 5 illustrates a tabulated document order and scanning order which summarizes this point. As shown in FIG. 5, a document order 124 will generally be defined by a series of pages 1, 2, 3, 4, 5, 6, and so forth. These pages may be provided on one or more sides of document sheets, however. Thus, in a scan job, the scan order 126 may differ, typically defining odd (recto) and even (verso) sets depending upon the location of the pages on recto or verso sides of scanned sheets. The series 128 defining the desired document order 124, thus, differs from the series 130 and 132 defining the scan order. In the illustrated example, a recto scan series 130 consists of a series of odd pages 1, 3 and 5. A verso scan series 132 consists of even pages on respective verso sides of the sheets of the first series 130, including pages 2, 4 and 6. The present technique enables automatic collating of such scanned sequences to map a scan order onto a desired document order.

It should also be noted that misfeeds within a batch job may occur in both the case of single-sided scanning and double-sided scanning. Where a misfeed occurs, a number of scanned pages, 6 in the example of FIG. 5, will not be recorded in memory. In general, however, for double-sided documents the misfeed may occur in either the recto series 130 or the verso series 132. In general, however, the overall number of pages in the scanned document will differ from a desired or known number of pages when a misfeed occurs. Where possible, the present technique also enables identification of the probable occurrence of a misfeed and either a recto or a verso series 130 or 132 in a double-sided batch job.

Figure 6:
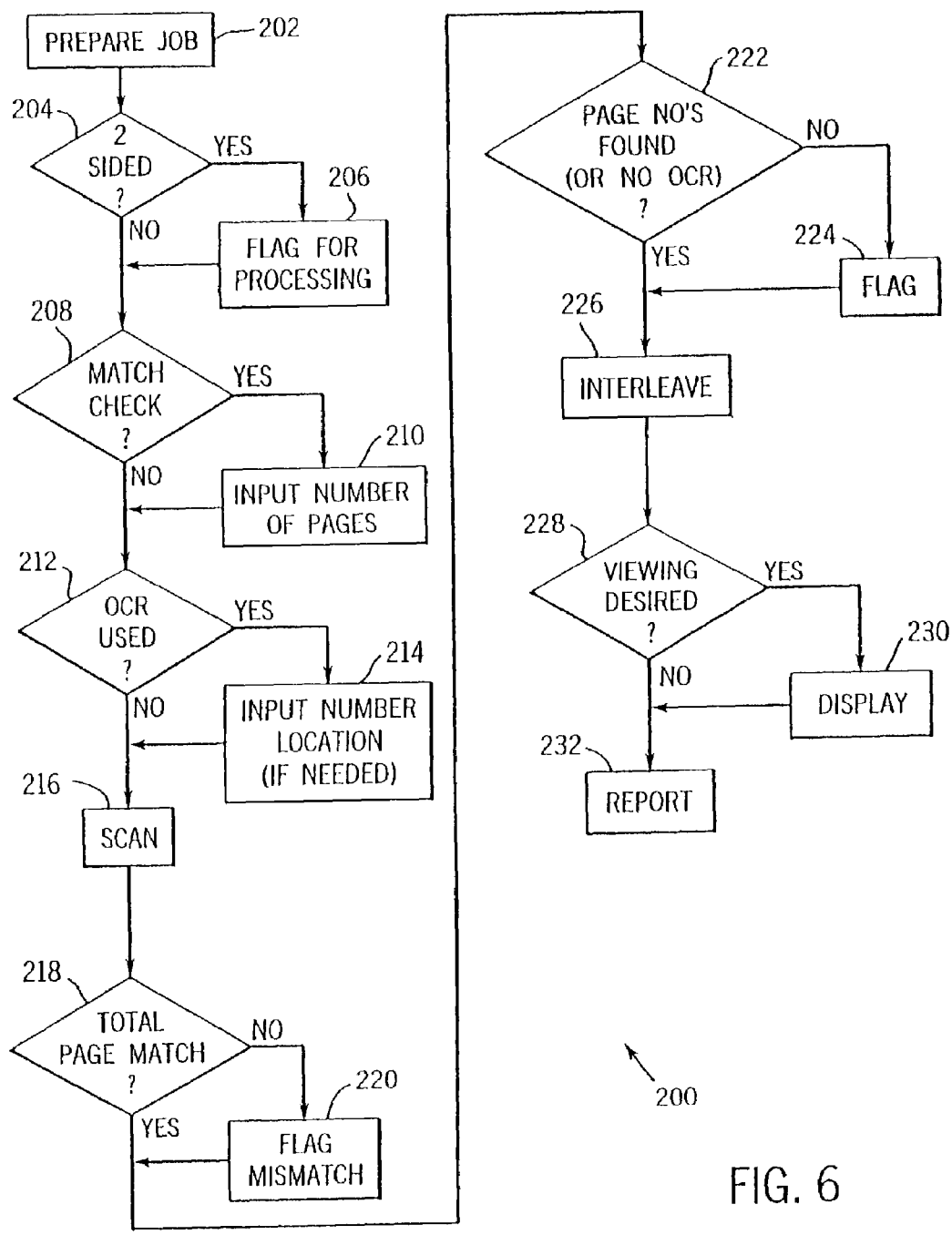

FIG. 6 summarizes exemplary steps in control logic for carrying out misfeed identification and reordering or collating operations described above. This control logic, designated generally by reference numeral 200, includes a series of steps generally summarized in FIG. 6, which would, when implemented, be defined by appropriate programming code well within the competence of one skilled in the art.

Logic 200 begins at step 202 where the batch job is prepared by assembling pages to be scanned. As mentioned above, the job may further include one or more cover sheets on which instruction sets are defined by darkened or otherwise contrasting regions placed and recognizable by the scanning device. At step 204 it is determined whether the job includes two-sided document pages. If such pages are included, automatic collating or reordering may be commanded as indicated at step 206. Such reordering processing may be either automatic upon recognition of a two-sided document, or may be operator programmed. In general, however, where memory circuit 40 stores and labels individual batch jobs separately, the two-sided job may be stored and labeled only after both sides of the document have been scanned and processed to maintain the document in a cohesive form.

At step 208, the scanning device determines whether a check for possible misfeeds is in order. Again, the scanning device may be programmed to monitor scan jobs for possible misfeeds, or may be enabled to do so only upon operator request. In general, however, where such verification is desired, a number of pages in the job is provided as indicated at step 210, such as through a scanned page or through operator manipulation of interface panel 26. As noted above, where functionalities on the scanning device provide for identification of the number of pages in a batch job, such as through a page counter, input tray sensor, or any suitable means, the number of pages in the job for use in the misfeed sequence may be obtained through the scanning device directly.

At step 212 the scanning device determines whether page identification routines such as optical character recognition software is employed. Where such routines are available and used for the collating functions described herein, a known or probable location of page identifying indicia may be input at step 214. As before, this input may be performed via a scanned instruction sheet or through operator input via panel 26. Alternatively, as mentioned above, the scanning device may be programmed to review encoded data in a number of regions to automatically identify such page designations.

With the instruction information determined as identified above, the batch document is scanned as indicated at step 216. As will be appreciated by those skilled in the art, this scanning operation includes feeding each page of the document through the scanning device at a known rate, encoding contrasting regions of each scanned page into digital values, processing and storing the digital values and identified pages or data sets. As noted above, where a two-sided document is processed, the scanning operation at step 216 will include inverting the document for scanning of the verso side of each page. It should also be noted that the inversion of scanned pages for encoding of two-sided documents may or may not result in feeding of pages in an order corresponding to the order of a recto series of scanned pages in the two-sided stack. For example, the stack may be scanned in an order of recto pages 1, 3, 5 and so forth in a first series, with the second series effectively scanning verso pages 2, 4, 6 and so forth. However, the second series may, alternatively, scan the same pages in a reverse order, such as beginning with the final verso page, followed by the penultimate verso page, and so forth. In the latter case, the reordering or collating operations described below may include reversing the order of the first or second series, in addition to interleaving of series pages.

At step 218 in the control logic summarized in FIG. 6, the control circuit 34 performs a comparison of the total number of pages scanned in the batch job with a desired or anticipated number of pages. If the resulting numbers do not match, a mismatch or misfeed flag is produced at step 220. The flag may include generation of a user alarm or notification which may be output via readout display 30 of the scanning device or on a printed report page. Following generation of the flag or notification, or if the total number of pages matches the desired or anticipated number, control advances to step 222. Where no collating is to be performed as described below, control may advance directly from the mismatch or misfeed identification steps to a viewing step 228 or report generation step 232.

At step 222 the control circuit determines whether page numbers were located in the anticipated or designated regions of the pages as described above. If no page numbers are located, but were anticipated, a flag may be set as indicated at step 224, notifying the user that no page numbers were found for the collating operation. Again, the flag or notification set at step 224 may result in the display of a notice on the scanning device or mention of the failure to identify page numbers in a batch job report. Similar results may be generated where no application software is provided for recognition of such page identifiers. As noted above, where character recognition routines are employed for locating a page identifier, such as a page number, the regions checked for the page identifiers may be analyzed in several possible orientations, typically rotated 90° from one another, so as to accurately identify the page identifiers regardless of the orientation of the page in the scanning device.

In processing where collating has been programmed, such collating or interleaving is performed at step 226. This collating or interleaving may be performed based upon page identifiers located at step 222, or simply based upon the interposition of odd and even pages from recto and verso series of the batch job. As noted above, tolerance in the processing and interleaving may be permitted where desired. For example, where page identifiers are recognized at step 222 for some, but not all pages, the interleaving performed at step 226 may permit sequence interleaving without requiring that all pages be identified. Thus, by way of example, a page "4" which is not so labeled may be interposed between a page "3" and a page "5" by virtue of identified pages "2" and "6" on either side of the page "4." Such permitted tolerances may be particularly well suited to pages having images, photographs, charts, and the like interposed between pages of text. As noted above, where the foregoing process identifies that certain pages are oriented in the scanning sequence and inconsistent page orientations (typically verso sides inverted with respect to recto sides), the collating routine may perform a rotation of one of the portions of the batch job to provide consistent page orientation in the resulting data.

Following the misfeed analysis and collating steps described above, the application software of the scanning device or of the computer system coupled to the scanning device may prompt the user for viewing of the scanned and collated document as indicated at step 228. Step 228 may include opening full-size or reduced-size reproductions of the scanned pages, permitting the viewer to verify that all pages are properly scanned and collated. This display step is summarized in FIG. 6 at reference numeral 230. Where the application software permits, the user may further modify the collation performed automatically, may delete certain pages from the scanned document, and so forth, based upon the displayed pages.

At step 232 a report is generated indicating that the scanning operation has been successfully completed. As noted above, the report may include information regarding possible misfed or mismatched pages, and the results of character recognition and collating operations. In addition to identifying mismatched pages, the report may also attempt to identify, within each series of pages, which series contains the mismatched page. The scanning, analyzing, and collating steps may be further followed by any suitable processing, data transmission, and similar operations, including transmission of facsimiles, printing of hard copies, and so forth.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for processing scanned data comprising:
   a scanning circuit configured to detect discrete regions of a plurality of document pages in a batch job and to generate scan data representative thereof;
   a memory circuit coupled to the scanning circuit for storing the scan data in separately identifiable pages, the pages being stored initially in a first order;
   a comparison circuit coupled to the memory circuit and configured to compare a count of the number of scanned pages of the batch job to a predefined number;
   an input circuit to input user-defined input data, and wherein the predefined number is programmable via the input circuit; and
   an output circuit coupled to the comparison circuit and configured to generate a user alert when the count of the number of scanned pages differs from the predefined number.

2. The system of claim 1, further including a collator coupled to the memory and responsive to stored page identifiers to reorder the stored page data for output in an order that is different from the first order.

3. A programmable scanning device comprising:
   a scanner configured to scan a plurality of document pages in a batch job including discrete regions of said pages being scanned to generate scan data representative of the scanned document pages and of associated page identifier data detected at said discrete regions;
   a memory coupled to the scanning circuit to store the scan data and detected page identifier data in separately identifiable pages, the pages being stored initially in a first order;
   a comparator coupled to the memory and configured to compare a count of the number of pages of the batch job being scanned by the scanner to a predefined count of pages intended to be scanned;
   an output circuit coupled to the comparator and configured to generate a user alert when the count of the number of scanned pages differs from the predefined count;
   a collator coupled to the memory and programmably responsive to stored page identifiers to reorder the stored page data for output in a second order different from the first order.

4. The programmable scanning device of claim 3, further comprising an input circuit to input user-defined input data, and wherein the predefined count is programmable via the input circuit.

5. The programmable scanning device of claim 3, wherein character recognition analysis of said stored scan data corresponding to said discrete regions is effected to identify the page identifiers associated with the respective pages.

6. The programmable scanning device of claim 5, wherein for each page of stored scan data, said character recognition analysis is carried out in sequence at locations corresponding to one or more predetermined discrete regions at which a page identifier may be located.

7. The programmable scanning device of claim 3, coupled to a display for receiving and displaying the reordered stored page data.

8. A programmable scanning device comprising:

a scanner configured to scan a plurality of document pages in a batch job including discrete regions of said pages being scanned to generate scan data representative of the scanned document pages and of associated page identifier data detected at said discrete regions;

a memory coupled to the scanning circuit to store the scan data and detected page identifier data in separately identifiable pages, the pages being stored initially in a first order;

a comparator coupled to the memory and configured to compare the number of pages of the batch job being scanned by the scanner to a user-definable count;

an output circuit coupled to the comparator and configured to generate a user alert when the number of scanned pages differs from the user-definable count;

a collator coupled to the memory and responsive to stored page identifiers to reorder the stored page data for output in a second order different from the first order;

wherein operation of said scanner and collator are controllable by program code stored in said memory, and wherein said memory also stores program code to effect character recognition analysis of said stored scan data corresponding to said discrete regions to identify the page identifiers associated with the respective pages for use by said collator to reorder the stored page data.

9. The programmable scanning device of claim 8, wherein for each page of stored scan data, said character recognition analysis is carried out in sequence at locations corresponding to one or more predetermined discrete regions at which a page identifier may be located.

10. The programmable scanning device of claim 8, coupled to a display for receiving and displaying the reordered stored page data stored in said memory.

11. The programmable scanning device of claim 8, wherein the second order is based on interleaving odd and even numbered pages of the batch job.

* * * * *

UNITED STATES PATENT AND TRADEMARK OFFICE
CERTIFICATE OF CORRECTION

PATENT NO. : 7,190,480 B2  Page 1 of 1
APPLICATION NO. : 10/208399
DATED : March 13, 2007
INVENTOR(S) : Derrill L. Sturgeon et al.

It is certified that error appears in the above-identified patent and that said Letters Patent is hereby corrected as shown below:

On the Title Page, Item -56-, under "U.S. Patent Documents", line 2, below "entry 2" insert -- 4,888,812   12/1989   Dinan et al. ... 235/379 --.

On the Title Page, Item -56-, under "U.S. Patent Documents", line 5, below "entry 5" insert -- 5,161,037   11/1992   Saito.... 358/468 --.

On the Title Page, Item -56-, under "U.S. Patent Documents", line 8, below "entry 8" insert -- 5,563,986   10/1996   Suzuki... 395/114 --.

On the Title Page, Item -56-, under "U.S. Patent Documents", line 9, above "entry 9" insert -- 5,801,837   9/1998   Hamanaka, et al. ... 358/296 --.

On the Title Page, Item -56-, under "U.S. Patent Documents", line 9, below "entry 9" insert -- 5,940,543   8/1999   Isemura et al. ..358/448 --.

On the Title Page, Item -56-, under "U.S. Patent Documents", line 10, above "entry 10" insert -- 6,101,283   8/2000   Knox.... 358/463 --.

In column 1, line 26, delete "fill" and insert -- full --, therefor.

Signed and Sealed this

Eleventh Day of November, 2008

JON W. DUDAS
*Director of the United States Patent and Trademark Office*